(No Model.)
G. H. SMITH.
WATCH BALANCE.
No. 510,202. Patented Dec. 5, 1893.
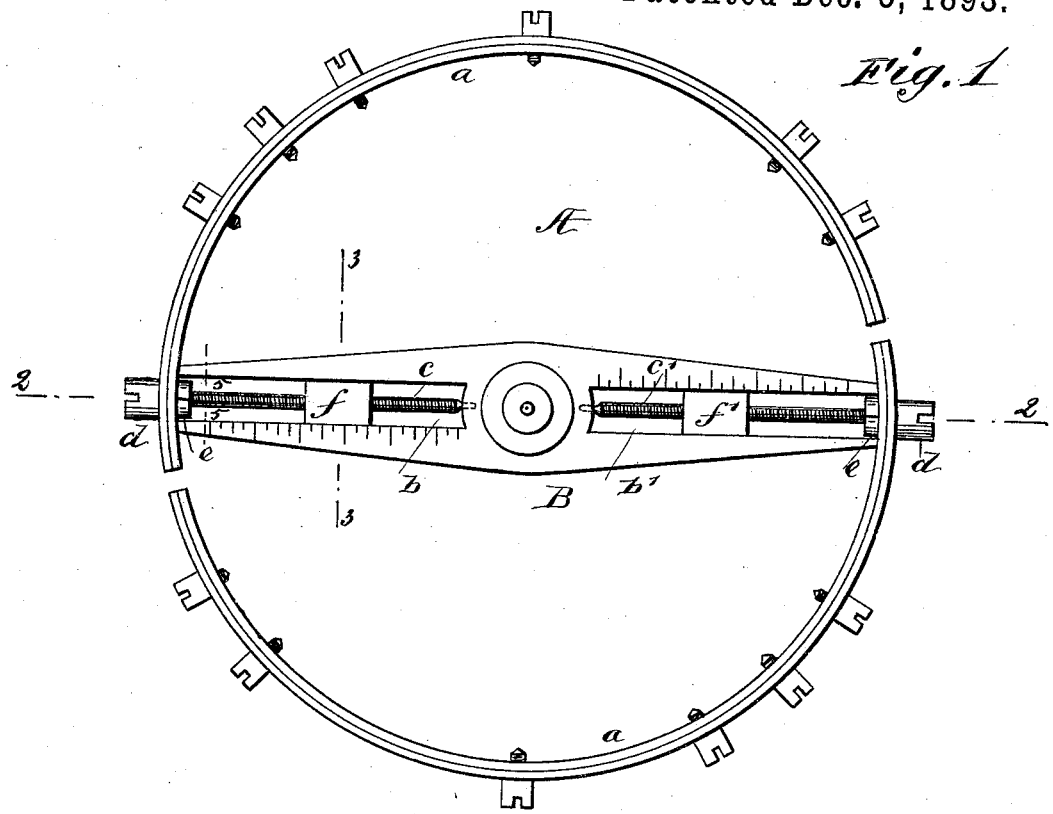
Fig. 1
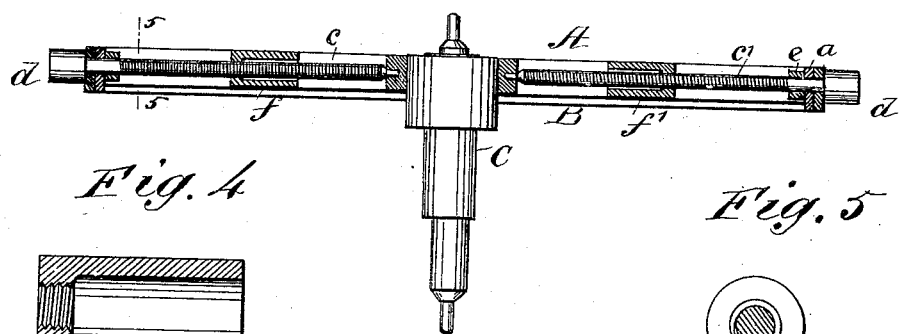
Fig. 2
Fig. 4
Fig. 5
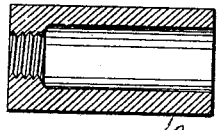
Fig. 3
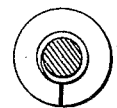
WITNESSES:
C. Neveux
C. Sedgwick
INVENTOR
G. H. Smith
BY Munn & Co
ATTORNEYS.

UNITED STATES PATENT OFFICE.

GEORGE H. SMITH, OF LANCASTER, OHIO, ASSIGNOR TO MARY O. SMITH AND THOMAS M. SMITH, OF SAME PLACE.

WATCH-BALANCE.

SPECIFICATION forming part of Letters Patent No. 510,202, dated December 5, 1893.

Application filed January 19, 1893. Serial No. 458,913. (No model.)

*To all whom it may concern:*

Be it known that I, GEORGE H. SMITH, of Lancaster, in the county of Fairfield and State of Ohio, have invented a new and Improved Balance Attachment for Watches, of which the following is a specification, reference being had to the annexed drawings, forming a part thereof, in which—

Figure 1 is a plan view of a balance having my attachment applied. Fig. 2 is a diametrical section taken on line 2—2 in Fig. 1. Fig. 3 is a transverse section taken on line 3—3 in Fig. 1. Fig. 4 is a longitudinal section of the adjustable weight, taken on line 4—4 in Fig. 3; and Fig. 5 is a transverse section taken on line 5—5 in Fig. 2.

Similar letters of reference indicate corresponding parts in all the views.

The object of my invention is to provide a simple and effective attachment for the balance wheels of watches, whereby the rate of vibration will be changed without shifting the screws in the balance.

My invention consists in the combination with a balance provided with longitudinally slotted arms, of sliding weights placed in the slots of the arms, screws passing longitudinally through the slots and through threaded holes in the weights, whereby the weights may be shifted along the slots, the holes in the weights being counterbored from their inner ends to provide a connection with the screw at the outer end only to permit of the expansion of the inner portion of the weight toward the center of the balance, all as will be hereinafter more fully described.

The balance A, is provided with the divided rim $a$, supported from the ends of the arm B, which is attached to the balance staff C. The rim $a$ is provided with the usual screws or weights connected therewith, and the arm B is furnished with longitudinal slots $b, b'$, extending from points near the staff C to the rim $a$. In the said slots $b, b'$, are placed screws $c, c'$, which are pivoted at their inner ends, and extending through the rim $a$ are provided with nicked heads $d$. To the screws inside of the rim $a$ are secured collars $e$. To the slots $b, b'$, are fitted weights $f, f'$, which are bored and threaded to receive the screws $c, c'$. The hole in each of the weights through which the screw passes is counter-bored from the end nearest the balance staff, and is therefore attached to the screw only at its outer end, thus permitting the body of the weight to expand inwardly toward the balance staff.

The weights $f, f'$, are shifted in accordance with the requirements of the watch so as to change the rate as may be necessary, moving them outwardly to retard the movement, and inwardly to accelerate it. The arm B is graduated along the sides of the slots $b, b'$, to permit of moving both of the weights through the same distance to insure a perfect balance.

Where my improvement is applied, the changing of the rate of the watch, aside from that effected by the shifting of the regulator and consequently lengthening or shortening of the hair spring, is effected by moving the weights $f, f'$, the usual method of adjustment by changing the screws in the rim being done away with.

Having thus described my invention, I claim as new and desire to secure by Letters Patent—

1. The combination, with a watch balance having slotted arms, of sliding weights placed in the slots of the arms and fitted closely to the sides of the slots, and a screw journaled in the slotted arms and fitting threaded holes in the weights for adjusting the weights lengthwise of the slotted arms, substantially as specified.

2. The combination, with a watch balance provided with longitudinally slotted arms, of weights bored longitudinally, threaded internally and counter-bored, leaving a thread at the outer ends thereof, and screws journaled in the rim and arm of the balance and fitted to the threaded holes in the weights, substantially as specified.

GEORGE H. SMITH.

Witnesses:
 GEO. EWING,
 FENWICK EWING.